Oct. 10, 1939.   C. T. PEARCE   2,175,851
LOAD CONTROL SYSTEM
Filed March 9, 1938
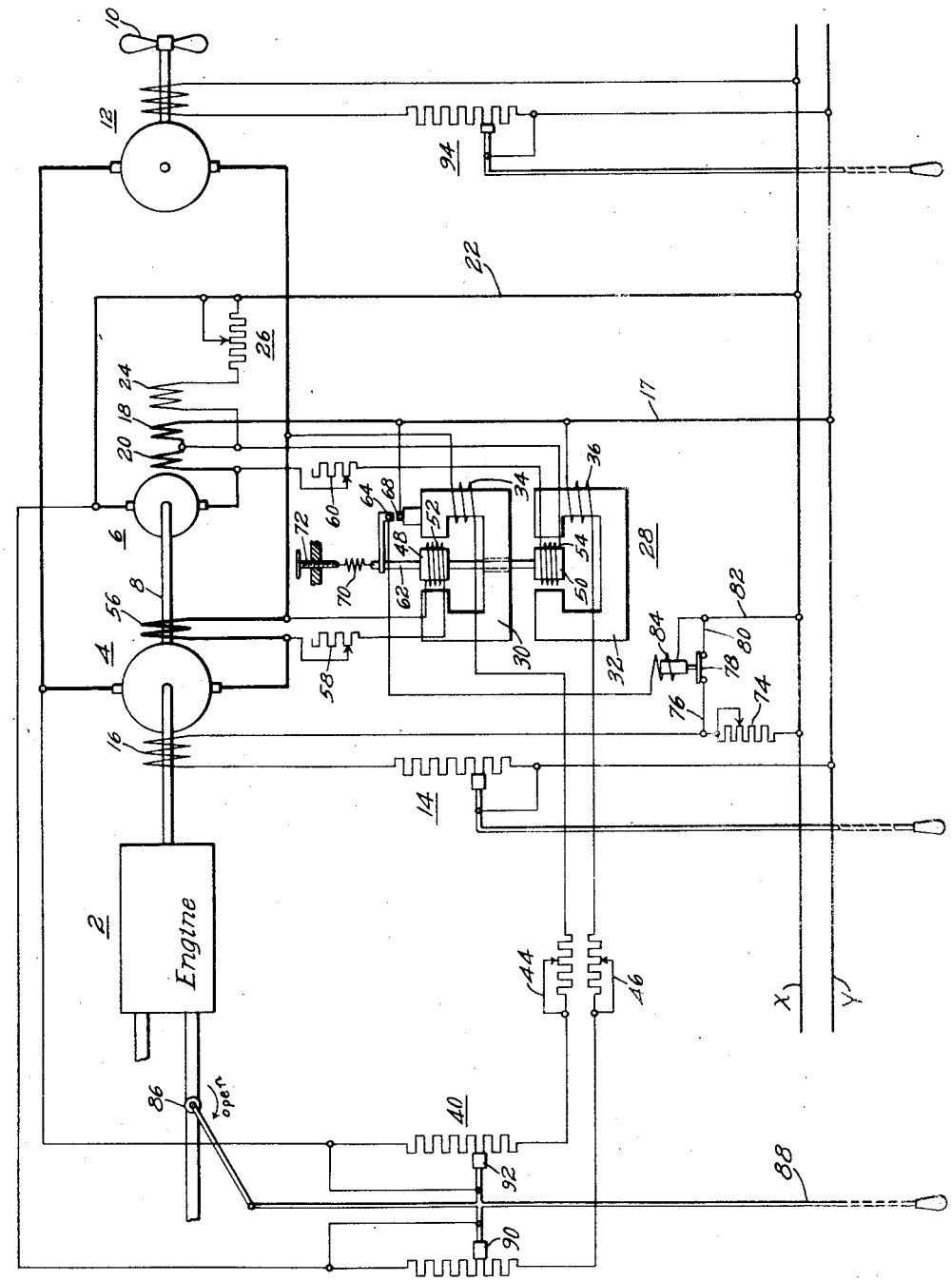
WITNESSES:
C. J. Weller.
Joe Weber
INVENTOR
Cullen T. Pearce.
BY
G. W. Crawford
ATTORNEY Patented Oct. 10, 1939

2,175,851

UNITED STATES PATENT OFFICE 2,175,851

LOAD CONTROL SYSTEM

Cullen T. Pearce, Ridley Park, Pa., assignor to Westinghouse Electric & Manufacturing Company, East Pittsburgh, Pa., a corporation of Pennsylvania Application March 9, 1938, Serial No. 194,818

17 Claims. (Cl. 290—40)

My invention relates, generally, to load control systems, and, more particularly, to systems for maintaining the load carried by a prime mover below a predetermined maximum.

In order to obtain best space-power efficiency some prime movers are rated and operated under loads so near to their maximum allowable loads that any overload may damage the prime mover. This is particularly true of internal combustion engines which furnish power for boats and especially of compression-ignition engines, more commonly called Diesel engines, since such engines are necessarily bulky and the space limitations on boats are an important consideration.

It is common practice to provide Diesel-electric drive for power boats, the usual system employing an electric motor to propel the boat, power for the propelling motor being provided by a main generator driven by a Diesel engine. The propelling motor speed is varied by varying the potential output of the generator by field control and, in addition, speed control may be provided by varying the field excitation of the propelling motor. Since it is necessary that the auxiliary power for the boat be supplied at a substantially constant voltage, a separate auxiliary generator is provided and this generator is driven by, and comprises a substantial part of the load on the Diesel engine.

The object of my invention is to provide a control system which shall function to limit the load placed upon a prime mover to a predetermined maximum.

Another object of the invention is to provide a protective system for a prime mover which drives a plurality of loads which shall function to reduce certain of said loads in order to limit the total load on the prime mover.

A further object of the invention is to provide a load control system for a prime mover which drives a main variable voltage generator and an auxiliary constant voltage generator which shall function to limit the load on the main generator in response to a predetermined total load on the two generators.

These and other objects and advantages of my invention will be apparent from the following detailed description taken in connection with the accompanying drawing, in which the single figure is a diagrammatic representation of a preferred embodiment of the invention showing the control system applied to the main and auxiliary generators of a Diesel electric powered boat.

In carrying out my invention, I provide a main generator driven by a Diesel engine and directly connected to an electric propeller drive. The auxiliary power for the boat is furnished by an auxiliary generator, also driven by the Diesel engine, whose potential it is desired to maintain substantially constant. A relay responsive to the total power consumed by the main and auxiliary generator loads is provided for reducing the voltage of the main generator to thus reduce the load on the main generator when the sum of the loads on the two generators exceeds a predetermined amount. Thus, the load on the Diesel engine is never allowed to become excessive and the auxiliary potential is not changed to limit the Diesel engine load.

Referring now to the drawing, an engine 2 which may be any prime mover, such as a Diesel engine, gas engine or steam engine, or may be an electric motor, drives a main generator 4 and an auxiliary generator 6 through a common shaft 8. A ship propeller 10 is driven by motor 12 which is connected in series circuit relation with the main generator 4. The voltage output of the main generator 4 may be varied to vary the speed of motor 12 by means of rheostat 14 connected in series circuit with the field winding 16 of the generator 4. The field winding 16 is connected to be energized from the auxiliary power conductors X and Y.

Auxiliary power is provided by the auxiliary generator 6, whose armature is connected to the auxiliary power conductors X and Y through conductor 17, series field winding 18, interpole field winding 20 and conductor 22. The shunt field winding 24 of the auxiliary generator 6 is connected to be energized by the output potential of the generator 6 and has a variable resistance 26 connected in circuit therewith to adjust the field current to provide the desired potential for auxiliary power.

A power limit regulating relay 28 is provided and comprises cores 30 and 32 energized by coils 34 and 36, respectively. Coils 34 and 36 are connected in parallel circuit relation with the armatures of generators 4 and 6, respectively, so as to provide energization for coils 34 and 36 proportional to the output potential of generators 4 and 6. Coils 34 and 36 are connected in series circuit relation with rheostats 40 and 42, respectively, and with adjustable resistances 44 and 46, respectively.

The regulator 28 also includes movable armatures 48 and 50, cooperating with cores 30 and 32, respectively, these armatures being provided with coils 52 and 54, respectively, which are movable with the armatures. Coils 52 and 54 are connected in parallel circuit relation with the interpole windings 56 and 20 of generators 4 and 6, respectively, to provide energization of coils 52 and 54 proportional to the armature currents of the generators 4 and 6. Suitable adjustable resistances 58 and 60 are connected in circuit with coils 52 and 54 to provide the necessary adjustment of the currents in these coils for the proper operation of the regulator 28. A shaft 62 connects the armatures 48 and 50 and supports a movable contact element 64, which cooperates with fixed contact element 68 and is normally biased to the open circuit position by a spring member 70, the tension of which may be adjusted by the adjustable thumb screw 72.

Thus it will be seen that the interaction of coils 34 and 52 will exert a force upon the shaft 62 proportional to the power output of the generator 4 in the reaction of the coils 54 and 36, or will exert a force upon shaft 62 proportional to the power output of auxiliary generator 6 so that a force will be exerted against the tension of spring 70 proportional to the total power output of the two generators 4 and 6.

An adjustable resistance element 74 is provided in series circuit relation with the field winding 16 of generator 4, and a circuit comprising conductor 76, contact element 78 and conductors 80 and 82 is provided for by-passing resistance element 74 to render it ineffective in the field circuit of generator 4. Contact element 78 may be moved to open circuit position by relay 84 which is connected to be energized when contact element 64 of the regulator 28 is moved to circuit closing position with respect to fixed contact element 68.

A throttle valve 86 is provided for varying the flow of fuel to the engine 2 and this valve may be operated by any suitable manual control such as rod 88. Rod 88 is mechanically connected to move contact elements 90 and 92 of rheostats 42 and 40, respectively, simultaneously in such a direction as to increase the effective resistance of the rheostats 42 and 40 simultaneously with the movement of the throttle valve 86 to open position. Thus, as the speed of the engine is increased by the opening of its throttle valve, the effectiveness of the regulator coils 34 and 36 is decreased.

In the operation of the device, the variable resistances 58 and 60, 44 and 46 and the tension of spring 70 and spacing of contact elements 64 and 68 are so adjusted as to permit the movable contact member 64 to be moved to circuit closing position with respect to contact element 68 when the total power output, as measured by the regulator 28, is equal to the maximum load that the engine 2 may be permitted to carry or to the maximum load it is desired to place upon the engine 2. Meanwhile, the speed of motor 12 will have been adjusted by varying its field excitation by means of rheostat 94 and by adjusting its applied armature potential by varying the excitation of generator 4 by means of the rheostat 16.

If now, the auxiliary power required on the ship should be increased, or if for any reason the power consumed by the motor 12 should be increased to values which would cause an overload of the engine 2, the regulator 28 will function to cause its contact element 64 to move to closed circuit position with respect to contact element 68 thereby energizing the relay 84 to move its contact element 78 to open circuit position. With contact element 78 in open circuit position, the resistance element 74 will be effective to reduce the current flow in the field winding 16 of generator 4 and thus reduce its output potential. When the output potential of generator 4 decreases, its power output will be decreased automatically by a reduction of speed of motor 12 due to the reduction of the potential applied to its armature.

The resulting reduction in the total power output of generators 4 and 6 will permit spring 70 to move contact 64 to open circuit position because of the reduced force applied by armatures 48 and 50 and this will, in turn, permit deenergization of relay 84 to permit the contact element 78 to move to closed circuit position, thus shorting out resistance 74 and again increasing the excitation of generator 4. Such a make-and-break movement between contact elements 64 and 68 of the regulator will continue so long as the conditions causing the overload exist and the relative intervals of make and break of the contact elements 64 and 68 will be determined by the amount of overload existing on the system.

The engine 2, particularly if it is a Diesel engine, will have a different maximum output rating at each of its speeds, the maximum output rating increasing with the speed of the engine. It will be seen that it is necessary that the regulator 28 be adjusted to respond to a larger value of total outputs of the generators 4 and 6 as the speed of the engine 2 is increased. This may be accomplished by rheostats 40 and 42 which are utilized to increase the resistance in the circuits of coils 34 and 36 of the regulator as the throttle valve 86 of engine 2 is opened to increase the speed of the engine. With the greater resistance in circuit with the coils 34 and 36 a greater amount of current flow in the armatures of the generators 4 and 6 will be required to move the contact element 64 to closed circuit position. Thus an automatic adjustment of the regulator 28 for the maximum power output corresponding to the position of the throttle valve 86 is provided. The resistance elements 40 and 42 may be so graduated as to provide an adjustment of regulator 28 which will make it respond to that maximum power rating to which the engine 2 is limited at any of its adjusted speeds.

With variation of the speed of engine 2, it will be necessary that an adjustment be made of variable resistance 26 in the circuit of field winding 24 of auxiliary generator 6 in order to provide substantially constant potential for the auxiliary conductors X and Y.

It is to be understood that the invention is not limited to any particular type of engine since any prime mover may be so controlled and that the control is not limited to a single main generator or a single auxiliary generator, nor is the invention limited to the particular type of maximum power regulator 28 herein disclosed since any equivalent element which will perform the desired function may be used. Control switches for any of the circuits shown may be provided, as desired.

The auxiliary generator 6 may be provided with any constant potential regulator which is common in the art to provide constant potential for the auxiliary power distribution conductors X and Y. If such a regulator is provided, or in the event that the potential output of generator 6 is sufficiently constant, the coil 36 of regulator 28 may be energized from any source of constant potential instead of from the output potential of generator 6.

Thus it will be seen that I have provided a control system for limiting the maximum load placed upon a prime mover by a plurality of generators driven by the prime mover which functions to limit the load on the prime mover by decreasing the output of certain of said generators while permitting the output potential of other of said generators to remain substantially constant and the output of said other generators to vary as the power demands on said other generators require.

In compliance with the requirements of the patent statutes, I have shown and described herein the preferred embodiment of my invention. It is understood, however, that the invention is not limited to the precise construction shown and described, but is capable of modification by one skilled in the art, the embodiments herein shown being merely illustrative of the principles of my invention.

I claim as my invention:

1. In a system for controlling the load on a prime mover which drives a plurality of generators having variable loads, means for controlling the output of certain of the generators only, and means responsive to a predetermined summation of loads on the plurality of generators for actuating said output controlling means.

2. In a system for controlling the load on a prime mover which drives a plurality of generators having variable loads, means for controlling the output potential of certain of the generators only, and means responsive to a predetermined summation of loads on the plurality of generators for actuating said output control means.

3. In a system for controlling the total load on a prime mover which drives a plurality of variable loads, load control means for controlling the amount of certain of the loads only, and means responsive to a predetermined summation of the plurality of loads for actuating said load control means.

4. In a load control system, in combination, a power translating device whose load it is desired to limit, a plurality of loading devices supplied with power by said translating device, means for limiting the amount of load taken by certain of said loading devices only, and means responsive to a predetermined total load taken by said plurality of loading devices for actuating said limiting means.

5. In a system for limiting the loading of a prime mover which drives a plurality of generators having variable loads, means for decreasing the output potential of certain of the generators only, and means responsive to a predetermined value of total load on the plurality of generators for actuating said output potential decreasing means.

6. In a system for limiting the loading of a prime mover which drives a plurality of generators having variable loads, means for decreasing the excitation of certain of the generators only, and means responsive to a predetermined value of total load on the plurality of generators for actuating said excitation decreasing means.

7. In a ship power plant, electric motor means for propelling the ship, main generator means for supplying power to said motor means, auxiliary generator means for supplying auxiliary power to the ship at a substantially constant potential, and means for decreasing the output potential of said main generator means only when the total load on said main and auxiliary generator means exceeds a predetermined amount.

8. In a ship power plant, electric motor means for propelling the ship, main generator means for supplying power to said motor means, auxiliary generator means for supplying auxiliary power for the ship at a substantially constant potential, and means responsive to the total load on said main and auxiliary generator means for decreasing the excitation of said main generator means only when said total load exceeds a predetermined amount.

9. In a ship power plant, a main generator providing energy for propelling the ship, an auxiliary generator providing auxiliary power for the ship, and means responsive to the total load on said generators for decreasing the load on said main generator only when the said total load exceeds a predetermined amount.

10. In a ship power plant, a main generator providing energy for propelling the ship, an auxiliary generator providing auxiliary power for the ship, a prime mover driving said generators, means for preventing overload of said prime mover comprising means for decreasing the power output of said main generator only, and means responsive to the total power output of said generators for actuating said power output decreasing means when said total load exceeds a predetermined amount.

11. In a ship power plant, a main generator providing energy for propelling the ship, an auxiliary generator providing auxiliary power for the ship, a prime mover driving said generators, means for preventing overload of said prime mover comprising means for decreasing the excitation of said main generator only, and means for actuating said excitation decreasing means in response to a predetermined total load on said two generators.

12. In a ship power plant, a main generator providing energy for propelling the ship, an auxiliary generator providing auxiliary power for the ship, prime mover means driving said generators, means for preventing overload of said prime mover means comprising means for decreasing the excitation of said main generator, means for actuating said excitation decreasing means in response to a predetermined total load on said two generators, and means for simultaneously changing the value of said predetermined total load and the operating characteristics of said prime mover means.

13. In a ship power plant, a main generator providing energy for propelling the ship, an auxiliary generator providing auxiliary power for the ship, a prime mover driving said generators, means for preventing overload of said prime mover comprising means for decreasing the excitation of said main generator, means for actuating said excitation decreasing means in response to a predetermined total load on said two generators, and means for simultaneously changing the energy flow to said prime mover and the value of said predetermined total load.

14. In a ship power plant, a main generator providing energy for propelling the ship, an auxiliary generator providing auxiliary power for the ship, an engine driving said main and auxiliary generators, means for preventing overload of said engine comprising means for decreasing the excitation of said main generator, means for actuating said excitation decreasing means in response to a predetermined value of total load on said generators, and means for simultaneously changing said predetermined value to which said actuating means is responsive and the throttle setting on said engine.

15. In a system for controlling the load on a prime mover which drives a plurality of generators having variable loads, means for controlling the output of certain of the generators only, means responsive to a predetermined summation of loads on the plurality of generators for actuating said output controlling means, and means for simultaneously changing the energy flow to said prime mover and the value of said predetermined summation of loads.

16. In a system for controlling the total load on a prime mover which drives a plurality of variable loads, load control means for controlling the amount of certain of the loads only, means responsive to a predetermined summation of the plurality of loads for actuating said load control means, and means for simultaneously changing the amount of energy flow to said prime mover and the value of said predetermined summation of loads.

17. In a load control system, in combination, a power translating device whose load it is desired to limit, a plurality of loading devices supplied with power by said translating device, means for limiting the amount of load taken by certain of said loading devices only, means responsive to a predetermined total load taken by said plurality of loading devices for actuating said limiting means, and means for simultaneously changing the amount of energy flow to said power translating device and the value of said predetermined total load.

CULLEN T. PEARCE.